United States Patent [19]
Okada et al.

[11] Patent Number: 5,726,962
[45] Date of Patent: Mar. 10, 1998

[54] COMPACT OPTICAL PICKUP DEVICE WITH BEAM SPLITTER

[75] Inventors: Kuniaki Okada, Tenri; Kohji Minami, Gose; Hiroyuki Yamamoto, Tenri; Yoshio Yoshida, Nara; Yukio Kurata, Tenri, all of Japan

[73] Assignee: Sharp Kabushiki Kaisha, Osaka, Japan

[21] Appl. No.: 465,886

[22] Filed: Jun. 6, 1995

[30] Foreign Application Priority Data

Dec. 19, 1994 [JP] Japan ................... 6-315349

[51] Int. Cl.⁶ .................................................. G11B 7/00
[52] U.S. Cl. .................. 369/112; 369/109; 369/110; 369/118; 369/44.12
[58] Field of Search .................... 369/44.12, 110, 369/112, 109, 44.14, 44.23, 44.24, 116, 118

[56] References Cited

U.S. PATENT DOCUMENTS

| | | |
|---|---|---|
| 4,733,065 | 3/1988 | Hoshi et al. ............... 369/112 X |
| 4,918,675 | 4/1990 | Lee ............................ 369/112 X |
| 5,095,476 | 3/1992 | Greve et al. ............... 369/112 X |
| 5,101,389 | 3/1992 | Obuchida et al. . |
| 5,208,800 | 5/1993 | Isobe et al. ................ 369/112 |
| 5,331,622 | 7/1994 | Ernst et al. ................ 369/112 |
| 5,404,490 | 4/1995 | Matsubayashi et al. ... 369/112 X |
| 5,428,584 | 6/1995 | Yoshida et al. ............ 369/112 X |

FOREIGN PATENT DOCUMENTS

| | | |
|---|---|---|
| 0 581 597 A2 | 2/1994 | European Pat. Off. . |
| 63-052342 | 3/1988 | Japan ................ 369/44.12 |
| 01003843 | 1/1989 | Japan ................ 369/110 |
| 308815 | 12/1991 | Japan . |
| 5266528 | 10/1993 | Japan . |
| 6-82644 | 3/1994 | Japan . |
| 6168462 | 6/1994 | Japan . |

OTHER PUBLICATIONS

H. Sato et al., *Sharp Technical Journal*, vol. 50, pp. 20–24, 1991, "Optical Pickup for 90mm Magneto–Optical Rewritable Disk".

*Primary Examiner*—Paul W. Huber
*Attorney, Agent, or Firm*—David G. Conlin; Brian L. Michaelis

[57] ABSTRACT

The optical pickup device according to the present invention, includes: a light emitting diode for emitting a light beam; a collimating lens for collimating the light beam; an objective lens for focusing the collimated light beam from the collimating lens onto a recording medium; a beam splitter for splitting the light beam returned from the recording medium into two light beams; a servo error signal detector for receiving one of the two light beams and detecting a servo error signal; a diffracting element for diffracting the one of the two light beams from the beam splitter to direct the one of the two light beams toward the servo error signal detector; and an optical waveguide element for receiving the other one of the two light beams and detecting a magneto-optical signal, the other one of the two light beams from the beam splitter being incident upon the optical waveguide element without passing through the diffracting element, wherein the beam splitter is disposed between the collimating lens and the diffracting element.

28 Claims, 11 Drawing Sheets

COMPACT OPTICAL PICKUP DEVICE WITH BEAM SPLITTER

BACKGROUND OF THE INVENTION

1. Field of the Invention

The present invention relates to an optical pickup device for use in an optical recording/reproducing apparatus which records information on and/or reproduces it from a recording medium such as a magneto-optical disk.

2. Description of the Related Art

Figure 9:
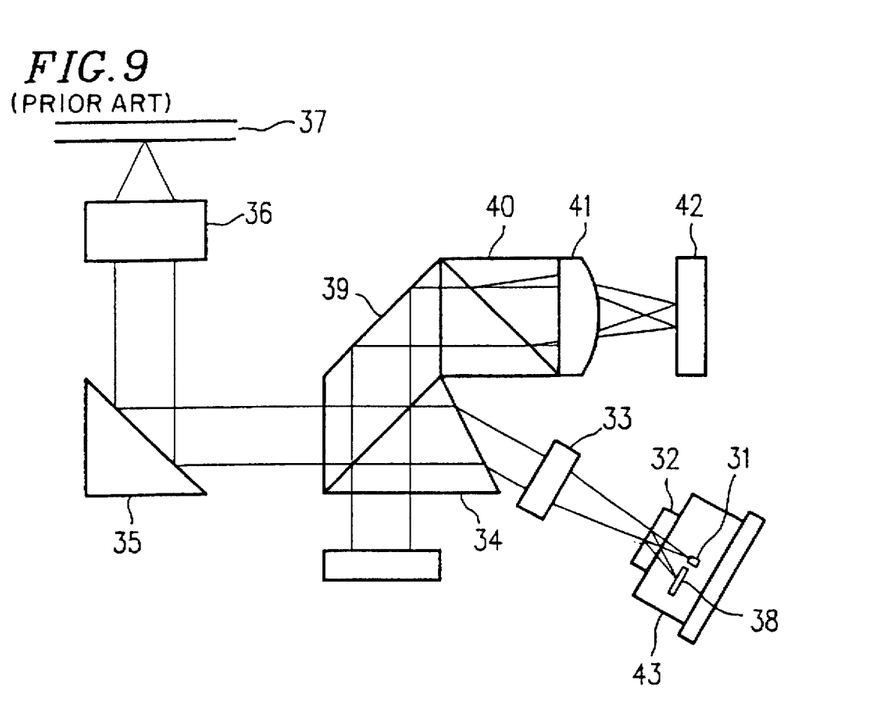
FIG. 9 is a front view of a conventional optical pickup device.

FIG. 9 shows a configuration of a conventionally known optical pickup device for magneto-optical disks. The optical pickup device includes a light source, e.g., a laser diode 31. Light emitted from the laser diode 31 passes through a holographic optical element 32, a collimating lens 33, and a polarized beam splitter 34, and has its direction changed by a mirror 35 to be focused onto a magneto-optical disk 37 by an objective lens 36.

Light reflected from the magneto-optical disk 37 is incident upon the polarized beam splitter 34 through the objective lens 36 and the mirror 35. Light which is incident upon the polarized beam splitter 34 is split into servo error signal detecting light and magneto-optical signal detecting light. The servo error signal detecting light passes through the polarized beam splitter 34 and is focused onto a servo error signal detector 38 by the collimating lens 33 so as to be incident upon the holographic optical element 32. Then, the light is diffracted by the holographic optical element 32 and guided into the servo error signal detector 38. On the other hand, the magneto-optical signal detecting light passes through a mirror 39, a Wollaston prism 40, and a spot lens 41 and is guided into a magneto-optical signal detector 42.

In the above-mentioned optical pickup device, the laser diode 31 and the servo error signal detector 38 composed of a photodiode are mounted on the identical stem so as to be accommodated in one package, and the holographic optical element 32 adheres to the upper face of the package. Accordingly, the laser diode 31, the servo error signal detector 38, and the holographic optical element 32 are integrated in quest to improve environment resistance.

Next, an optical pickup device using an optical waveguide element will be described with reference to FIG. 10.

Light emitted from a laser diode 51 passes through a holographic optical element 52 and a collimating lens 53, and has its direction changed by a composite mirror 54 composed of a half mirror plate and a total reflection mirror so as to be focused onto a magneto-optical disk 56 by an objective lens 55.

Light reflected from the magneto-optical disk 56 is incident upon the composite mirror 54 through the objective lens 55 and is split into servo error signal detecting light and magneto-optical signal detecting light. The servo error signal detecting light is incident upon the holographic optical element 52 through the collimating lens 53 and is diffracted by the holographic optical element 52 so as to be guided into a photodiode 57. On the other hand, the magneto-optical signal detecting light passes through the collimating lens 53 so as to be guided into a coupler portion of an optical waveguide element 58 without passing through the holographic optical element 52. The optical waveguide element 58 splits received light into polarized components having different polarization direction, and detects a signal based on the resulting polarized components.

Generally, in order to allow a laser beam to be coupled to the optical waveguide element 58, it is required to strictly control an incident angle and an incident position of light to be incident upon the optical waveguide element 58. However, light diffracted by the holographic optical element 52, the diffraction angle of which is varied depending upon a wavelength of the incident light, is extremely difficult to be coupled to the optical waveguide element 58. In the optical pickup device as shown in FIG. 10, the magneto-optical signal detecting light is coupled to the optical waveguide element 58 without passing through the holographic optical element 52; thus, the influence of the fluctuation of a wavelength of the incident light can be suppressed. In addition, a Wollaston prism is omitted from the optical pickup device, so that the device can be made small and light-weight.

The conventional optical pickup device only composed of bulk materials as shown in FIG. 9 uses an expensive Wollaston prism fabricated by attaching crystal prisms for the purpose of detecting a magneto-optical signal. This hinders the device from being brought down in size, weight, and cost.

Figure 10:
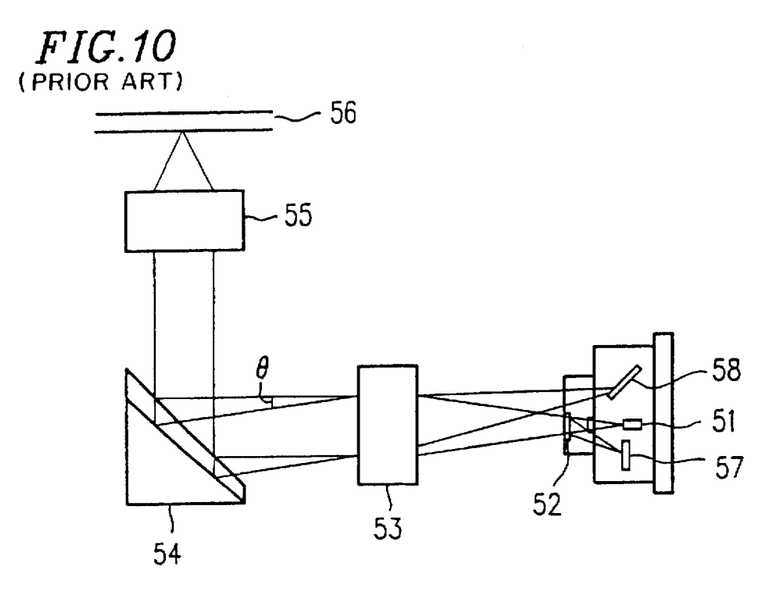
FIG. 10 is a front view of another conventional optical pickup device.

On the other hand, the optical pickup device using an optical waveguide element as shown in FIG. 10 can be made small and light-weight, because a Wollaston prism can be omitted therefrom. The integrated configuration of a light source, a servo error signal detecting photodiode, and a magneto-optical signal detecting photodiode in one package also enables the device to be made smaller and more light-weight. However, when the composite mirror 54 is composed of a half mirror plate and a total reflection mirror attached to each other, light beams respectively reflected by the half mirror plate and the total reflection mirror are focused onto the magneto-optical disk 56 through the objective lens 55, which deteriorates a signal quality. In order to avoid this, it is required to position the composite mirror 54 and the objective lens 55 at a certain distance therebetween or to make the composite mirror 54 thicker; thus, it was not possible to make the optical pickup device thin. When the half mirror plate is made of a plate having a pair of flat faces, light beams reflected by both faces thereof are focused onto the identical point, so that it is required to prescribe the cross-section of the half mirror plate to be a wedge shape.

Since one of the reflected light beams should be guided into the optical waveguide element 58, it is required to strictly control an incident angle and an incident position of the light beam to be incident upon the optical waveguide element 58 in order to allow the light beam to be stably coupled to the optical waveguide element 58. Thus, a tilt angle of both faces of the half mirror plate should be determined with higher accuracy than that of an ordinary processing.

SUMMARY OF THE INVENTION

The optical pickup device of the present invention includes: a light emitting diode for emitting a light beam; a collimating lens for collimating the light beam; an objective lens for focusing the collimated light beam from the collimating lens onto a recording medium; a beam splitter for splitting the light beam returned from the recording medium into two light beams; a servo error signal detector for receiving one of the two light beams and detecting a servo error signal; a diffracting element for diffracting the one of the two light beams from the beam splitter to direct the one of the two light beams toward the servo error signal detector; and an optical waveguide element for receiving the other one of the two light beams and detecting a magneto-optical signal, the other one of the two light beams from the beam splitter being incident upon the optical waveguide element without passing through the diffracting element, wherein the beam splitter is disposed between the collimating lens and the diffracting element.

In one embodiment of the invention, the beam splitter includes a prism and a glass plate having two plane faces opposing to each other, a partial reflection mirror is formed on one of the two plane faces which is an interface between the prism and the glass plate, and a total reflection mirror is formed on the other one of the two plane faces.

In another embodiment of the invention, the beam splitter includes a prism and a glass plate having two plane faces opposing to each other, and a mirror which is made of a multi-layer film and has a polarization characteristic is formed on one of the two plane faces which is an interface between the prism and the glass plate, while a total reflection mirror is formed on the other one of the two plane faces, whereby a Kerr rotation angle is multiplied.

In another embodiment of the invention, the light beam emitted by the light emitting diode is incident upon a first region of the total reflection mirror, the light beam returned from the recording medium is incident upon a second region of the total reflection mirror, the thickness of the glass plate is determined so that the first region does not overlap a second region, and an antireflection film is provided in the first region.

In another embodiment of the invention, the light beam emitted by the light emitting diode is incident upon a first region of the total reflection mirror, the light beam returned from the recording medium is incident upon a second region of the total reflection mirror, the thickness of the glass plate is determined so that the first region does not overlap a second region, and a light scattering film is provided in the first region.

In another embodiment of the invention, an aperture diaphragm is disposed between the light emitting diode and the beam splitter.

In another embodiment of the invention, the optical waveguide element includes a microlens, a prism and a polarized beam splitting portion, the other one of the two light beams from the beam splitter passing through the microlens and the prism in this order and then entering the polarized beam splitting portion.

In another embodiment of the invention, the polarized beam splitting portion of the optical waveguide element includes two waveguides having different structures at a boundary between which the thickness is changed in a tapered shape, and polarized components of the other one of the two light beams entering the optical waveguide element are refracted at angles different from each other, whereby the polarized components are separated.

In another embodiment of the invention, the optical waveguide element includes two or more boundaries of the two waveguides, the other of the two light beams entering the optical waveguide element passing through the two or more boundaries.

In another embodiment of the invention, the microlens is integrated with the prism.

Thus, the invention described herein makes possible the advantage of providing an optical pickup device which can be readily made small and light-weight.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative examples with reference to the drawings.

Figure 1:
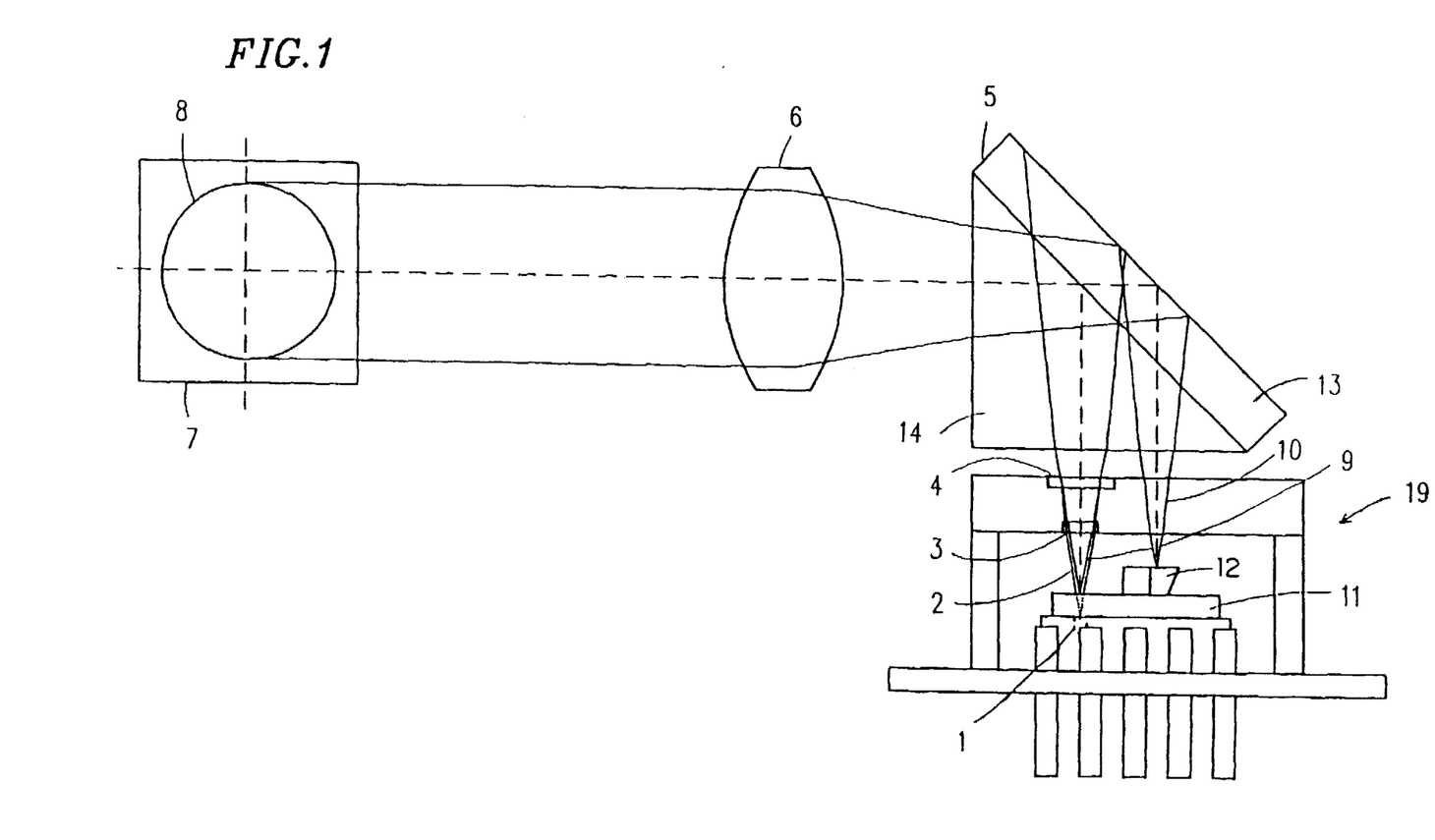
FIG. 1 is a front view of an optical pickup device of an example according to the present invention.

FIG. 1 is a front view of an optical pickup device of an example according to the present invention. The optical pickup device is configured as described below.

Light 2 emitted from a light source, e.g., a laser diode 1 passes through a grating 3 and a holographic optical element 4, and is incident upon a beam splitter 5 composed of a glass plate 13 and a prism 14. The incident light 2 is reflected by a mirror at an interface between the glass plate 13 and the prism 14 so as to have its optical path changed. Then, the light 2 passes through a collimating lens 6, is reflected by a mirror 7 (i.e., a mirror for changing the optical path of the light 2 so as to be in parallel with the direction perpendicular to the recording medium), and is focused onto a recording medium such as a magneto-optical disk (not shown) by an objective lens 8.

The light 2 reflected from the magneto-optical disk is incident upon the beam splitter 5 after passing through the objective lens 8, the mirror 7, and the collimating lens 6. At the beam splitter 5, the light 2 is split into servo error signal detecting light 9 and magneto-optical signal detecting light 10. The servo error signal detecting light 9 is incident upon the holographic optical element 4 from the beam splitter 5. The servo error signal detecting light 9 is diffracted by the holographic optical element 4 and is guided into a photodiode 11 to be detected as a servo error signal. On the other hand, the magneto-optical signal detecting light 10 is reflected by the mirror surface on a reverse side of the glass plate 13 included in the beam splitter 5 and is guided into a coupler portion of an optical waveguide element 12 without passing Through the holographic optical element 4. The light coupled to the coupler portion of the optical waveguide element 12 is split into polarized components each having a different polarization direction, and the polarized components are guided into a photodetector. The photodetector detects a magneto-optical signal based on the polarized components.

Next, the beam splitter 5 will be described in detail with reference to FIG. 2.

The beam splitter 5 is composed of the glass plate 13 and the prism 14 adhering to each other. A b-face of the glass plate 13 is a total reflection mirror and an a-face of the glass plate 13 (i.e., an interface between the glass plate 13 and the prism 14) is a partial reflection mirror or a polarizing mirror. Thus, the beam splitter 5 is configured so as to have a polarization characteristic. These mirrors are made of a dielectric multi-layer film, a metallic film, or the like. In particular, when a mirror made of a multi-layer film is formed on the a-face, a Kerr rotation angle (described later) can be multiplied.

As described above, the light 2 emitted from the laser diode 1 is reflected by the a-face to travel to the objective lens 8 and the magneto-optical disk. Then, the light 2 travels in the same optical path to return to the a-face. The light 2 is partially reflected by the a-face to become the servo error signal detecting light 9. The servo error signal detecting light 9 is guided into the photodiode 11 (i.e., a photodetector) by the holographic optical element 4 which is a diffracting element. On the other hand, the magneto-optical signal detecting light 10 having passed through the a-face is totally reflected by the b-face to pass through the a-face to be guided into the optical waveguide element 12.

The magneto-optical signal detecting light 10 guided into the optical waveguide element 12 does not pass through the holographic optical element 4; therefore, in this arrangement, the light 10 is not diffracted and as a result, the amount of the light 10 is not decreased. Furthermore, in the case where the diffracted light is coupled to the optical waveguide element 12, the variations of an incident position and an incident angle caused by the wavelength fluctuation of the incident light leads to the decrease in efficiency of optical waveguide coupling. In this arrangement, such a problem is not caused, so that a magneto-optical signal can be stably obtained.

Figure 2:
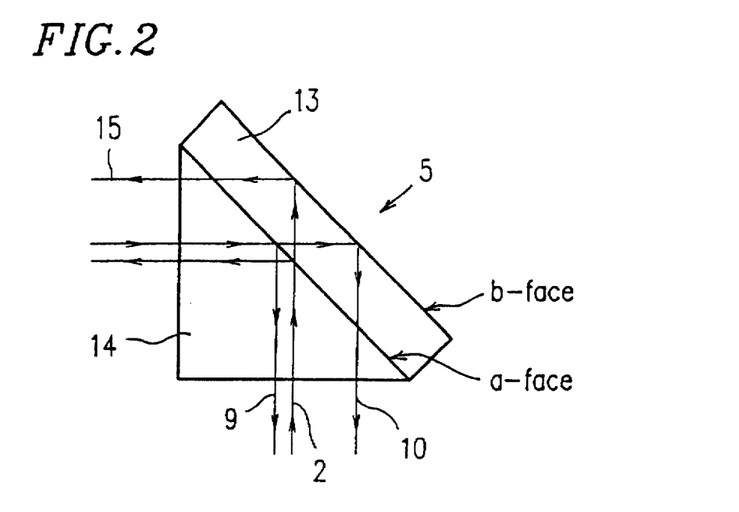
FIG. 2 is a front view showing a configuration of a beam splitter of the optical pickup device shown in FIG. 1.

In the optical pickup device of the present example as shown in FIG. 2, light 15 emitted from the laser diode 1 is reflected by the b-face after passing through the a-face, passes through the collimating lens 6 and the objective lens 8, and is focused onto the magneto-optical disk. Then, the light 15 reflected from the magneto-optical disk is detected by the photodetectors. This causes a signal quality to be degraded. In order to avoid this problem, the collimating lens 6 should be positioned at a sufficient distance from the objective lens 8 so as not to allow the light 15 reflected by the b-face to be incident upon the objective lens 8. However, this arrangement is not desired, because it results in the enlargement of the optical pickup device.

For example, in the case where the glass plate 13 has a thickness of 1 mm, and the collimating lens 6 has a numerical aperture (NA) of 0.17 and a focal length of 10.7 mm, the collimating lens 6 and the objective lens 8 should be positioned at a distance of 17 mm from each other.

Figure 3:
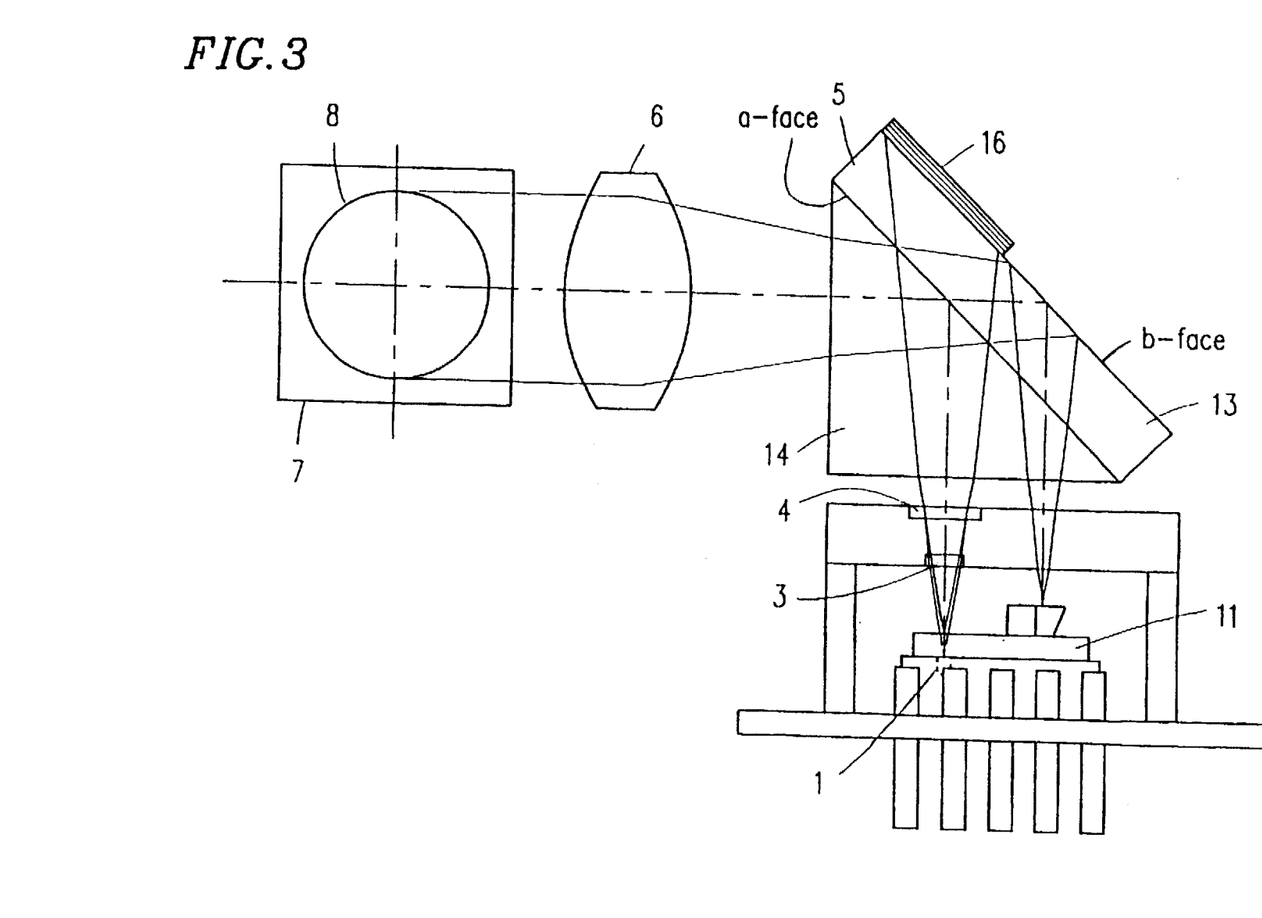
FIG. 3 is a front view of an optical pickup device of another example according to the present invention.
Figure 4:
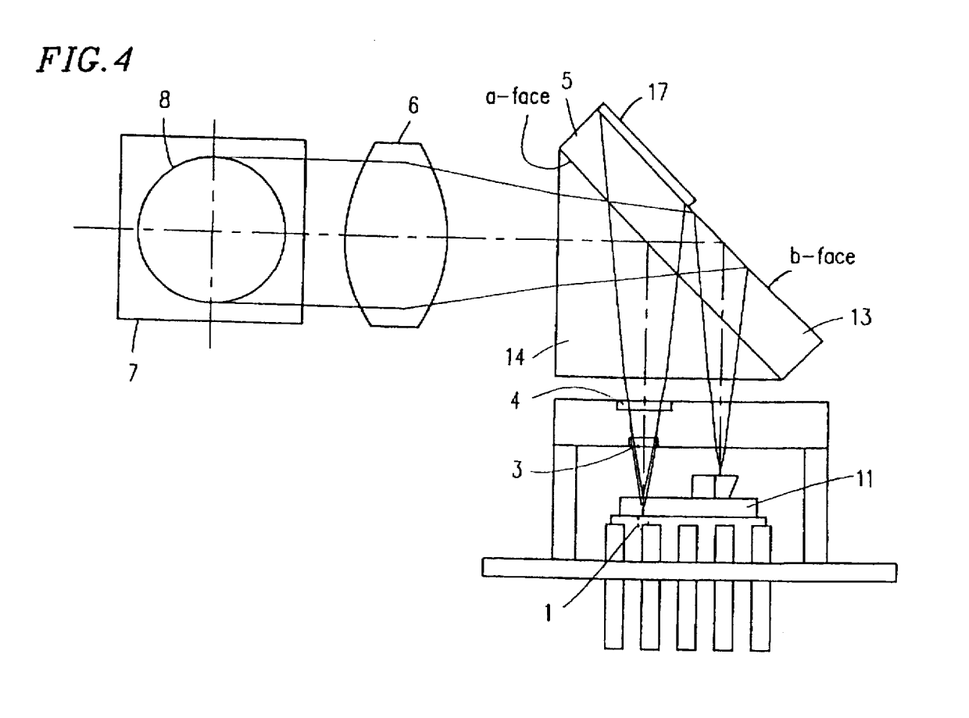
FIG. 4 is a front view of an optical pickup device of still another example according to the present invention.

However, as shown in FIGS. 3 and 4, if the thickness of the glass plate 13 of the beam splitter 5 is set to be sufficiently large, a region where the light emitted from the light source and passed through the a-face is irradiated and a region where the light reflected from the magneto-optical disk and passed through the a-face is irradiated can be separated on the b-face. When a light scattering film 16 or an antireflection film 17 is provided on the region where the light emitted from the light source and passed through the a-face is irradiated, stray light caused by the light reflected by the b-face can be eliminated. Therefore, it is not necessary to position the collimating lens 6 at a certain distance from the objective lens 8; as a result, the optical pickup device can be miniaturized without degrading a signal quality.

When the beam splitter 5 is provided with a polarization characteristic, a Kerr rotation angle can be multiplied; therefore, a signal quality can be improved. Assuming that the reflectance of P-polarized light of the a-face is p, and that of the S-polarized light is s, the multiplication of factor B of the Kerr rotation angle satisfies the relationship B=(1−p)/(1−s). Specifically, assuming that the reflectance of the P-polarized light is 0%, and that of the S-polarized light is 70%, the multiplication factor B of the Kerr rotation angle is 3.33 and the utilization factor of the S-polarized light is 9%.

Figure 5:
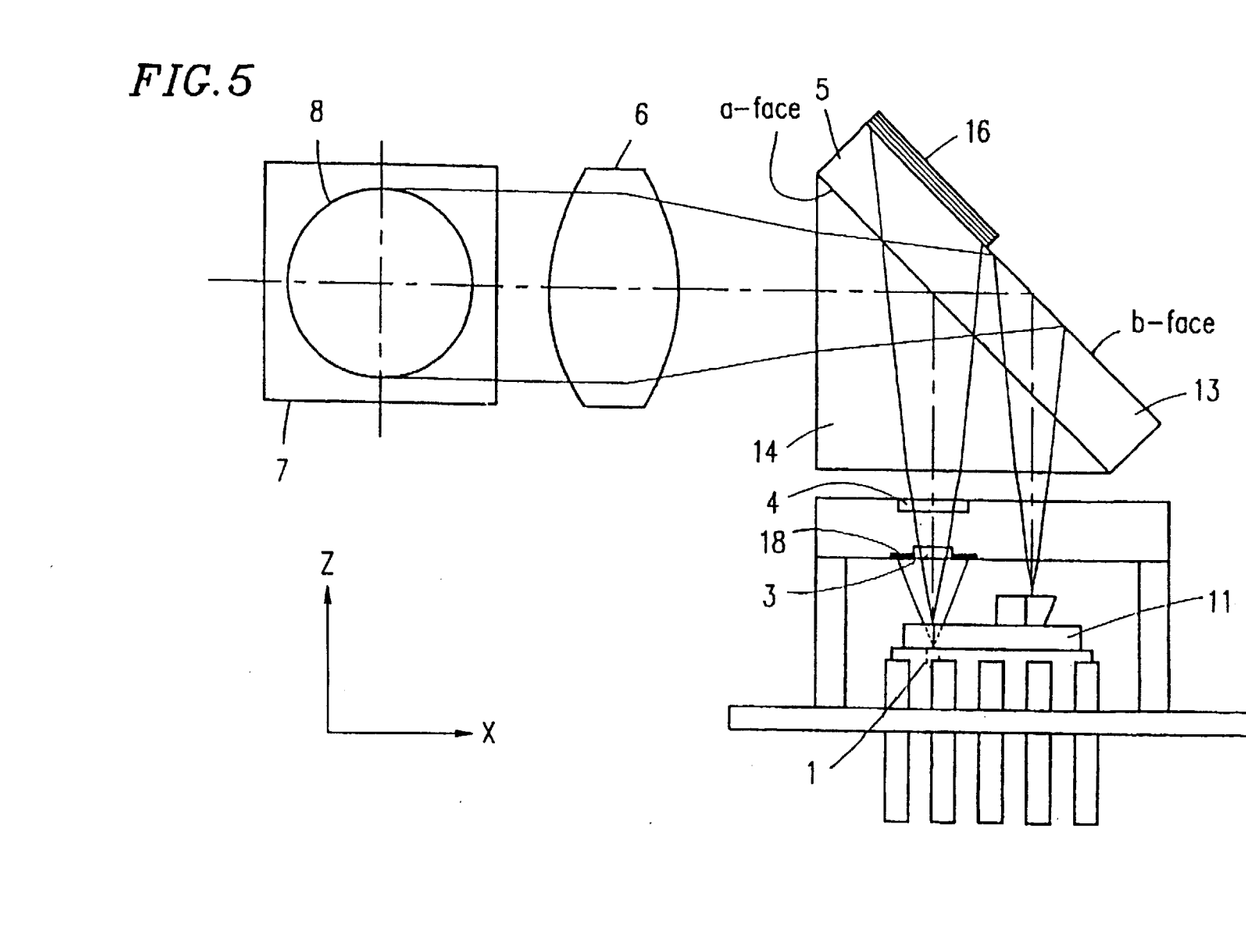
FIG. 5 is a front view of an optical pickup device of still another example according to the present invention.

In this case, the light 2 emitted from the laser diode 1 should be S-polarized light. However, an ordinary laser diode emits a beam having a far-field pattern in an elliptical shape and having an electric field component in a short axis direction of the elliptical far-field pattern. Therefore, a laser beam spreads to a great degree in a direction parallel to an X-axis shown in FIG. 5. As a result, on the b-face of the beam splitter 5, the light emitted from the laser diode 1 cannot be separated from the light returning from the magneto-optical disk. In this case, by providing an aperture diaphragm 18 between the laser diode 1 and the beam splitter 5 so as to limit the spreading angle of the light incident upon the beam splitter 5, as shown in FIG. 5, the above-mentioned problem can be solved.

Furthermore, in the beam splitter 5, by providing a polarizing mirror only at a portion of the a-face performing beam-splitting, instead of forming a partial reflection mirror over the a-face, the reflection of the magneto-optical signal detecting light 10 from the a-face can be reduced. Specifically, in the above example, the utilization factor of the S-polarized light can be increased from 9% to 30%.

Figure 6:
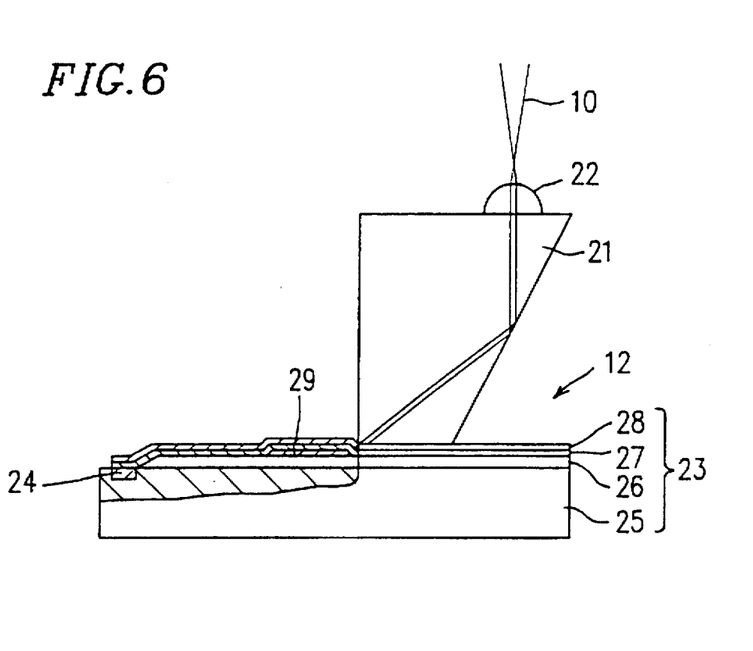
FIG. 6 is a front view (partial cross-sectional view) of an optical waveguide element of the optical pickup device shown in FIG. 1.

Next, a magneto-optical signal detecting system will be described with reference to FIGS. 6 and 7. The magneto-optical signal detecting light 10 reflected by the b-face of the beam splitter 5 is guided into the package 19 (see FIG. 1) without passing through the holographic optical element 4. The magneto-optical signal detecting light 10 is diverged after being converged and is guided into a prism 21 as shown in FIG. 6. The diverged light is collimated by a microlens 22 provided on a prism 21 and is coupled to an optical waveguide element 23 at a predetermined incident angle. The light guided into the optical waveguide element 23 from the optical coupler is split into each polarized component by a polarized beam splitter. A magneto-optical signal is detected by a photodiode 24 which has received the polarized components thus split. As the polarized beam splitter, for example, a mode splitter (Japanese Laid-Open Patent Publication No. 6-82644) utilizing the difference in refractive index of each polarized beam component can be used.

When a light source, a photodetector, an optical waveguide element, and the like are accommodated in the package 19, the resulting device can be made small and light-weight; furthermore, productivity and environmental resistance of the device can be enhanced.

Figure 11:
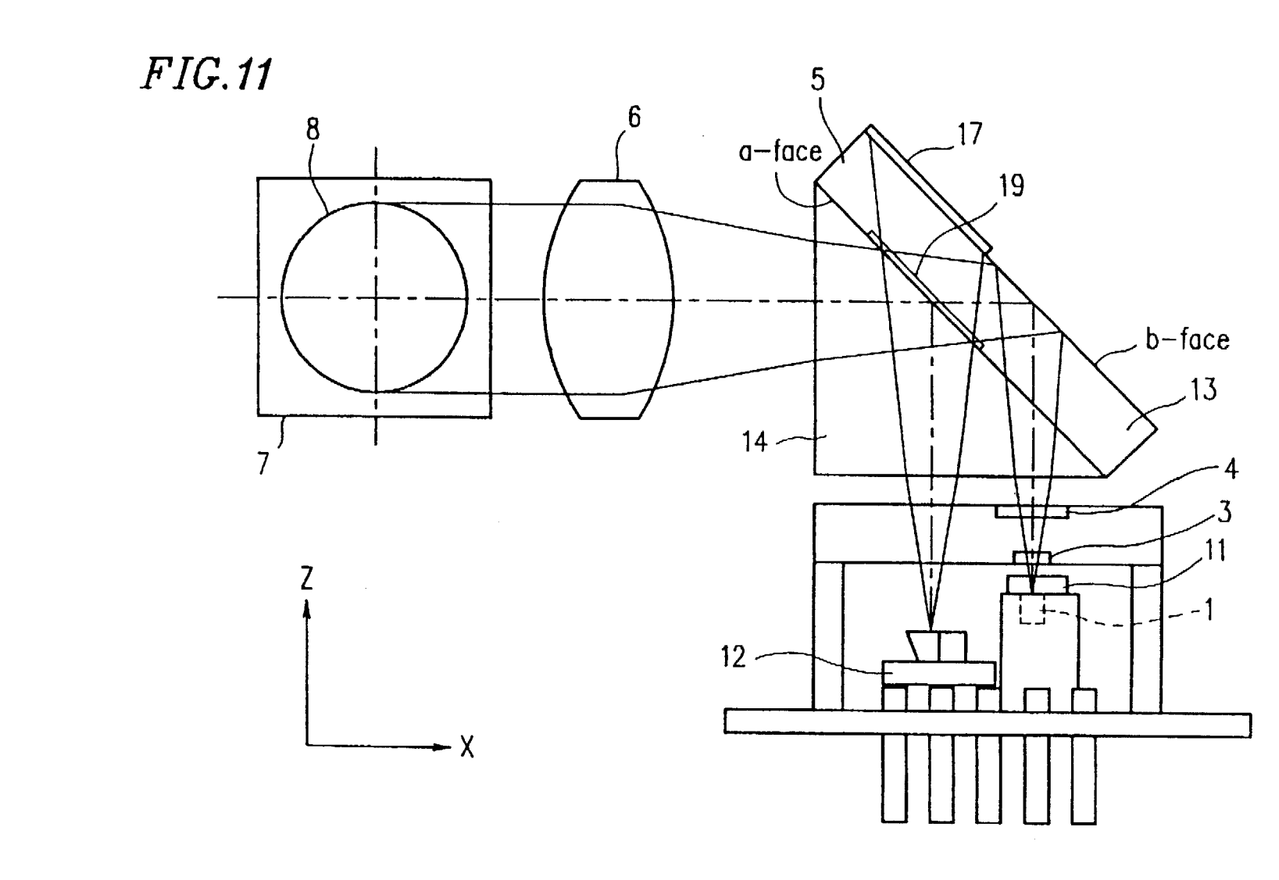
FIG. 11 is a front view of an optical pickup device of still another example according to the present invention.

As shown in FIG. 11, the laser diode 1 can be provided on the side of the glass plate 13 of the beam splitter 5, and the optical waveguide element 12 can be provided on the side of the prism 14. In other words, the laser diode 1 can be positioned so as to be farther away from the collimating lens 6, compared with the optical waveguide element 12. In this case, the light emitted from the laser diode 1 becomes P-polarized light which spreads to a great degree in a direction parallel to a Y-axis (shown in FIG. 12). This makes it unnecessary to use an aperture diaphragm. The reflection from the a-face of the light immediately after emitted from the laser diode 1 causes a problem. However, this problem can be solved by providing the polarizing mirror 19 only on a portion of the beam splitter 5 performing beam splitting. If the polarizing mirror is designed so that the reflectance of the P-polarized light has a reflectance of 30% and the S-polarized light has a reflectance of 100%, a Kerr rotation angle multiplication factor of 3.33 can be obtained.

Next, a production example of the optical waveguide element 23 will be described.

In the present example, as the optical waveguide element 23, two optical waveguides having different structures, at a boundary between which the thickness is changed in a tapered shape, are used. The guided light is allowed to travel diagonally across the boundary. At this time, since the refractive index of the optical waveguides are different depending upon the polarization direction, each polarized light is refracted at a different refractive angle. In the present example, by providing two or more of such boundaries, the optical waveguide length is shortened.

The production example will be more specifically described with reference to FIGS. 6 and 7. First, an Si substrate 25 is subjected to thermal oxidation to form a buffer layer 26 (thickness: about 2 μm) made of $SiO_2$ thereon. Then, as shown in FIG. 6, a high refractive layer 29 made of glass with a high refractive index, e.g., $Ta_2O_5$ is formed on a polarized beam splitting portion (region D) shown in FIG. 7. Furthermore, a glass film (CORNING #7059) 27 is formed over the high refractive layer 29 as a waveguide layer, and an $SiO_2$ film is formed as a gap layer for prism coupling.

Exemplary numerical values of each layer, such as those of refractive index and film thickness are shown below.

Laser wavelength: 780 nm

Gap layer: ng=1.43, d=200 nm

Waveguide layer: nf=1.53, d=570 nm

High refractive layer: nh=1.9, d=115 nm

Buffer layer: nb=1.43

Under the above conditions, the effective refractive index of the respective regions C and D of the waveguide layer become as shown in Table 1. This leads to the difference in refractive index of each polarized beam.

|    | Region C | Region D |
| --- | --- | --- |
| TE | 1.484 | 1.589 |
| TM | 1.478 | 1.542 |

Figure 7:
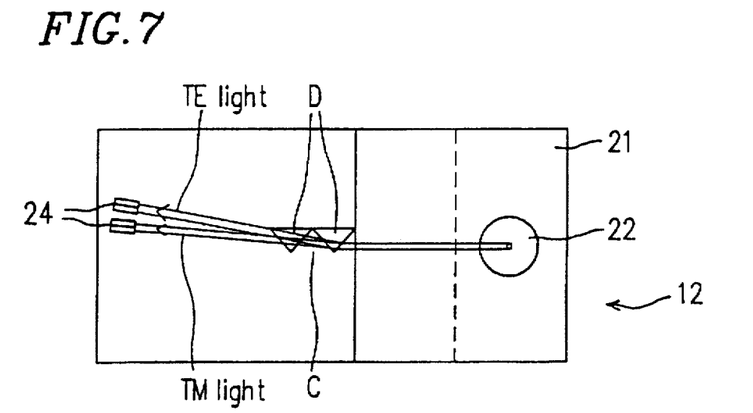
FIG. 7 is a plan view of the optical waveguide element shown in FIG. 6.

As shown in FIG. 7, when the light is incident upon a boundary between the region C and the region D at an incident angle of 45° and is allowed to pass through a polarized beam splitting portion (region D) in an isosceles right triangle once, the difference in refractive angle between the respective polarized beams becomes 3.5°. In order to detect each polarized beam by each photodiode 24, the distance between the light beams on the respective photodiodes 24 is required to be about 50 μm, and the waveguide length is required to be about 850 μm. When the light is allowed to pass through the polarized beam splitting portion twice, the difference in refractive angle becomes larger (i.e., 7.6°), and the required waveguide length can be shortened to be about 400 μm. Thus, the optical waveguide element 12 can be decreased in size.

The optical waveguide element 12 can be produced by the application of IC technology; therefore, the optical waveguide element 12 has outstanding productivity. In addition, since optical systems can be integrated on one substrate, the optical waveguide element 12 can be made small and light-weight.

Figure 8:
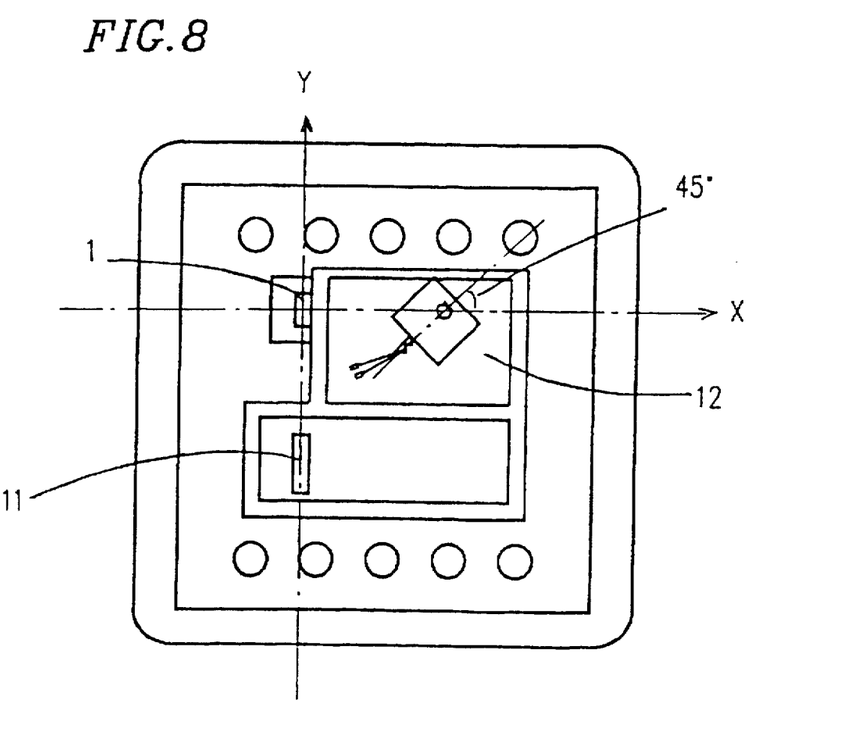
FIG. 8 is a plan view showing an arrangement of a package of the optical pickup device shown in FIG. 1.

FIG. 8 shows an exemplary arrangement of the optical waveguide element 12, the laser diode 1, and the photodiode 11 for detecting a servo error signal. The polarization direction of the light emitted from the laser diode 1 is in parallel with the Y-axis. On the other hand, the magneto-optical signal detecting light has its polarization plane rotated by 1° to 2° due to the Kerr effect. However, the rotation amount is small; therefore, it is desired that the polarized components having a polarization direction of ±45° with respect to the polarization direction of the light focused onto the magneto-optical disks are detected and a differential signal is detected. As shown in FIG. 8, when the optical waveguide element 12 is positioned so as to form an angle of 45° with respect to the X-axis, a TE-mode and a TM-mode of the optical waveguide element 12 correspond to the polarized components having a direction of ±45° with respect to the polarization direction of the light emitted from the laser diode, whereby a reproduced signal with a high S/N can be obtained.

Figure 12:
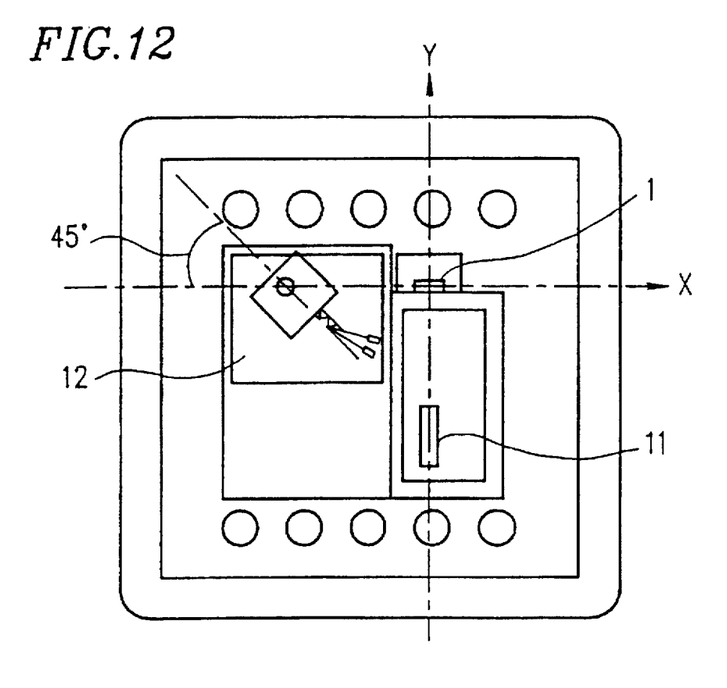
FIG. 12 is a plan view showing an arrangement of a package of the optical pickup device shown in FIG. 11.

FIG. 12 shows an exemplary arrangement of the package 19 of the optical pickup device shown in FIG. 11. The polarization direction of the light emitted from the laser diode 1 is in parallel with the X-axis and has a far-field pattern spreading in the Y-axis direction.

As described above, in the optical pickup device of the present invention, the beam splitter is positioned between the collimating lens and the holographic optical element working as a diffracting element, instead of being positioned between the objective lens and the collimating lens, whereby a part of light returning from the magneto-optical disk is guided into the optical waveguide element in the package including the light source without passing through the diffracting element, and a magneto-optical signal is detected.

Because of the above arrangement, a small optical waveguide element having outstanding productivity can be used in place of a large expensive Wollaston prism, resulting in a small and light-weight optical pickup device. In addition, since it is not required that the objective lens is positioned at a certain distance from the deflective mirror and that the half mirror plate of the composite mirror is designed so as to have large thickness, the resulting optical pickup device can be made thinner.

Furthermore, the beam splitter can be more readily fabricated at lower cost by using a mirror plate and a triangular prism, compared with the composite mirror using a half mirror plate in a wedge shape requiring higher processing accuracy. When the beam splitter is provided with a polarization characteristic, a signal quality can be improved by the effect of Kerr rotation angle multiplication. Furthermore, by designing the mirror plate so as to have large thickness and providing an antireflection film and a light scattering film on a part of the mirror, light emitted from the light source and reflected by the mirror plate surface can be prevented from being incident upon the collimating lens and is focused onto the magneto-optical disk surface to be stray light; therefore, the distance between the collimating lens and the objective lens can be shortened without degrading a signal quality; as a result, an optical pickup device can be made smaller and more light-weight. In this case, when the aperture diaphragm is provided in the optical path between the light source and the beam splitter, the spreading angle of the light emitted from the light source can be limited. Therefore, an optical pickup device can be miniaturized without degrading a signal quality.

According to the present invention, polarized beam separation for detecting a magneto-optical signal is performed by using a small optical waveguide element including a microlens, a prism, and a polarized beam splitting portion of optical waveguide type. The light is coupled to the optical waveguide element by prism coupling, so that the problem related to the fluctuation of a wavelength of a laser beam, caused when using a laser diode as a light source, can be solved.

When the boundary between two optical waveguide elements with different structures is formed as a tapered coupling portion whose thickness is changed in a tapered shape, and a light beam passes through the boundary so as to travel diagonally across it, the following advantage can be obtained: Each polarized beam is refracted with a different refractive angle from each other because the refractive index of the respective optical waveguide elements is varied depending upon the polarization direction, and polarized beam separation with a high extinction ratio can be performed. Furthermore, by forming two or more boundaries and allowing a light beam to pass through these boundaries, the difference in refractive angle of each polarized beam can be made large, and an optical waveguide length can be shortened. Still furthermore, a microlens is provided on the upper face of the prism so as to be integrated therewith, an optical waveguide element can be made smaller.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup device comprising:

light emitting means for emitting a light beam;

a collimating lens for collimating the light beam;

an objective lens for focusing the collimated light beam from the collimating lens onto a recording medium;

beam splitting means for splitting the light beam returned from the recording medium into two light beams;

servo error signal detecting means for receiving one of the two light beams and detecting a servo error signal;

a diffracting element for diffracting the one of the two light beams from the beam splitting means to direct the one of the two light beams toward the servo error signal detecting means;

optical waveguide means for receiving the other one of the two light beams and detecting a magneto-optical signal, the other one of the two light beams from the beam splitting means being incident upon the optical waveguide means without passing through the diffracting element, wherein the beam splitting means is disposed between the collimating lens and the diffracting element;

wherein after reflection from a respective surface of the beam splitter, one of the two light beams is guided toward the optical waveguide means and split into its polarized components in the optical waveguide means for detecting a magneto-optical signal;

wherein the beam splitting means includes a prism and a glass plate having two plane faces opposing to each other, a partial reflection mirror is formed on one of the two plane faces which is an interface between the prism and the glass plate, and a total reflection mirror is formed on the other one of the two plane faces; and wherein the light beam emitted by the light emitting means is incident upon a first region of the total reflection mirror, the light beam returned from the recording medium is incident upon a second region of the total reflection mirror, the thickness of the glass plate is determined so that the first region does not overlap a second region, and an antireflection film is provided in the first region.

2. An optical pickup device according to claim 1, wherein an aperture diaphragm is disposed between the light emitting means and the beam splitting means.

3. An optical pickup device according to claim 1, wherein the optical waveguide means includes a microlens, a prism and a polarized beam splitting portion, the other one of the two light beams from the beam splitting means passing through the microlens and the prism in this order and then entering the polarized beam splitting portion.

4. An optical pickup device according to claim 3, wherein the polarized beam splitting portion of the optical waveguide means includes two waveguides having different structures at a boundary between which the thickness is changed in a tapered shape, and polarized components of the other one of the two light beams entering the optical waveguide means are refracted at angles different from each other, whereby the polarized components are separated.

5. An optical device according to claim 4, wherein the optical waveguide means includes two or more boundaries of the two waveguides, the other of the two light beams entering the optical waveguide means passing through the two or more boundaries.

6. An optical pickup device according to claim 3, wherein the microlens is integrated with the prism.

7. An optical pickup device according to claim 1, wherein both the optical wave guide means and the light emitting means being accommodated within the same package.

8. An optical pickup device comprising:

light emitting means for emitting a light beam;

a collimating lens for collimating the light beam;

an objective lens for focusing the collimated light beam from the collimating lens onto a recording medium;

beam splitting means for splitting the light beam returned from the recording medium into two light beams;

servo error signal detecting means for receiving one of the two light beams and detecting a servo error signal;

a diffracting element for diffracting the one of the two light beams from the beam splitting means to direct the one of the two light beams toward the servo error signal detecting means;

optical waveguide means for receiving the other one of the two light beams and detecting a magneto-optical signal, the other one of the two light beams from the beam splitting means being incident upon the optical waveguide means without passing through the diffracting element, wherein the beam splitting means is disposed between the collimating lens and the diffracting element;

wherein after reflection from a respective surface of the beam splitter, one of the two light beams is guided toward the optical waveguide means and split into its polarized components in the optical waveguide means for detecting a magneto-optical signal;

wherein the beam splitting means includes a prism and a glass plate having two plane faces opposing to each other, and a mirror which is made of a multi-layer film and has a polarization characteristic is formed on one of the two plane faces which is an interface between the prism and the glass plate, while a total reflection mirror is formed on the other one of the two plane faces, whereby a Kerr rotation angle is multiplied; and wherein the light beam emitted by the light emitting means is incident upon a first region of the total reflection mirror, the light beam returned from the recording medium is incident upon a second region of the total reflection mirror, the thickness of the glass plate is determined so that the first region does not overlap a second region, and an antireflection film is provided in the first region.

9. An optical pickup device according to claim 8, wherein an aperture diaphragm is disposed between the light emitting means and the beam splitting means.

10. An optical pickup device according to claim 8, wherein the optical waveguide means includes a microlens, a prism and a polarized beam splitting portion, the other one of the two light beams from the beam splitting means passing through the microlens and the prism in this order and then entering the polarized beam splitting portion.

11. An optical pickup device according to claim 10, wherein the polarized beam splitting portion of the optical waveguide means includes two waveguides having different structures at a boundary between which the thickness is changed in a tapered shape, and polarized components of the other one of the two light beams entering the optical waveguide means are refracted at angles different from each other, whereby the polarized components are separated.

12. An optical device according to claim 11, wherein the optical waveguide means includes two or more boundaries of the two waveguides, the other of the two light beams entering the optical waveguide means passing through the two or more boundaries.

13. An optical pickup device according to claim 10, wherein the microlens is integrated with the prism.

14. An optical pickup device according to claim 8, wherein both the optical wave guide means and the light emitting means are accommodated within the same package.

15. An optical pickup device comprising:
light emitting means for emitting a light beam;
a collimating lens for collimating the light beam;
an objective lens for focusing the collimated light beam from the collimating lens onto a recording medium;
beam splitting means for splitting the light beam returned from the recording medium into two light beams;
servo error signal detecting means for receiving one of the two light beams and detecting a servo error signal;
a diffracting element for diffracting the one of the two light beams from the beam splitting means to direct the one of the two light beams toward the servo error signal detecting means;
optical waveguide means for receiving the other one of the two light beams and detecting a magneto-optical signal, the other one of the two light beams from the beam splitting means being incident upon the optical waveguide means without passing through the diffracting element,
wherein the beam splitting means is disposed between the collimating lens and the diffracting element;

wherein after reflection from a respective surface of the beam splitter, one of the two light beams is guided toward the optical waveguide means and split into its polarized components in the optical waveguide means for detecting a magneto-optical signal;

wherein the beam splitting means includes a prism and a glass plate having two plane faces opposing to each other, a partial reflection mirror is formed on one of the two plane faces which is an interface between the prism and the glass plate, and a total reflection mirror is formed on the other one of the two plane faces; and wherein the light beam emitted by the light emitting means is incident upon a first region of the total reflection mirror, the light beam returned from the recording medium is incident upon a second region of the total reflection mirror, the thickness of the glass plate is determined to that the first region does not overlap a second region, and a light scattering film is provided in the first region.

16. An optical pickup device according to claim 15, wherein an aperture diaphragm is disposed between the light emitting means and the beam splitting means.

17. An optical pickup device according to claim 15, wherein the optical waveguide means includes a microlens, a prism and a polarized beam splitting portion, the other one of the two light beams from the beam splitting means passing through the microlens and the prism in this order and then entering the polarized beam splitting portion.

18. An optical pickup device according to claim 17, wherein the polarized beam splitting portion of the optical waveguide means includes two waveguides having different structures at a boundary between which the thickness is changed in a tapered shape, and polarized components of the other one of the two light beams entering the optical waveguide means are refracted at angles different from each other, whereby the polarized components are separated.

19. An optical device according to claim 18, wherein the optical waveguide means includes two or more boundaries of the two waveguides, the other of the two light beams entering the optical waveguide means passing through the two or more boundaries.

20. An optical pickup device according to claim 17, wherein the microlens is integrated with the prism.

21. An optical pickup device according to claim 15, wherein both the optical wave guide means and the light emitting means are accommodated within the same package.

22. An optical pickup device comprising:
light emitting means for emitting a light beam;
a collimating lens for collimating the light beam;
an objective lens for focusing the collimated light beam from the collimating lens onto a recording medium;
beam splitting means for splitting the light beam returned from the recording medium into two light beams;
servo error signal detecting means for receiving one of the two light beams and detecting a servo error signal;
a diffracting element for diffracting the one of the two light beams from the beam splitting means to direct the one of the two light beams toward the servo error signal detecting means;
optical waveguide means for receiving the other one of the two light beams and detecting a magneto-optical signal, the other one of the two light beams from the beam splitting means being incident upon the optical waveguide means without passing through the diffracting element,
wherein the beam splitting means is disposed between the collimating lens and the diffracting element;

wherein after reflection from a respective surface of the beam splitter, one of the two light beams is guided toward the optical waveguide means and split into its polarized components in the optical waveguide means for detecting a magneto-optical signal;

wherein the beam splitting means includes a prism and a glass plate having two plane faces opposing to each other, and a mirror which is made of a multi-layer film and has a polarization characteristic is formed on one of the two plane faces which is an interface between the prism and the glass plate, while a total reflection mirror is formed on the other one of the two plane faces, whereby a Kerr rotation angle is multiplied; and wherein the light beam emitted by the light emitting means is incident upon a first region of the total reflection mirror, the light beam returned from the recording medium is incident upon a second region of the total reflection mirror, the thickness of the glass plate is determined so that the first region does not overlap a second region, and a light scattering film is provided in the first region.

23. An optical pickup device according to claim 22, wherein an aperture diaphragm is disposed between the light emitting means and the beam splitting means.

24. An optical pickup device according to claim 21, wherein the optical waveguide means includes a microlens, a prism and a polarized beam splitting portion, the other one of the two light beams from the beam splitting means passing through the microlens and the prism in this order and then entering the polarized beam splitting portion.

25. An optical pickup device according to claim 24, wherein the polarized beam splitting portion of the optical waveguide means includes two waveguides having different structures at a boundary between which the thickness is changed in a tapered shape, and polarized components of the other one of the two light beams entering the optical waveguide means are refracted at angles different from each other, whereby the polarized components are separated.

26. An optical device according to claim 25, wherein the optical waveguide means includes two or more boundaries of the two waveguides, the other of the two light beams entering the optical waveguide means passing through the two or more boundaries.

27. An optical pickup device according to claim 26, wherein the microlens is integrated with the prism.

28. An optical pickup device according to claim 25, wherein both the optical wave guide means and the light emitting means are accommodated within the same package.

* * * * *